No. 738,338. PATENTED SEPT. 8, 1903.
W. LOUDEN.
HAY CARRIER.
APPLICATION FILED APR. 21, 1902.
NO MODEL. 2 SHEETS—SHEET 2.

Witnesses
Inventor
William Louden.

No. 738,338. Patented September 8, 1903.

UNITED STATES PATENT OFFICE.

WILLIAM LOUDEN, OF FAIRFIELD, IOWA.

HAY-CARRIER.

SPECIFICATION forming part of Letters Patent No. 738,338, dated September 8, 1903.

Application filed April 21, 1902. Serial No. 104,073. (No model.)

*To all whom it may concern:*

Be it known that I, WILLIAM LOUDEN, a citizen of the United States, residing at Fairfield, in the county of Jefferson and State of Iowa, have invented new and useful Improvements in Hay-Carriers, of which the following is a specification.

My invention relates to that class of hay-carriers having a rope-catch; and it consists of certain improvements in the construction and arrangement thereof which makes it more certain in operation, more convenient to handle, and more compact in form, which features are fully described in this specification, and more particularly set forth in the claims.

Figure 1:
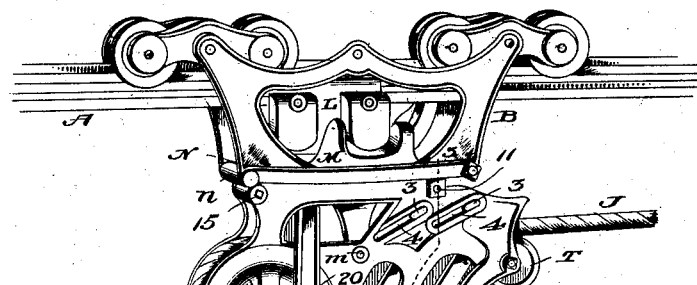
Figure 2:
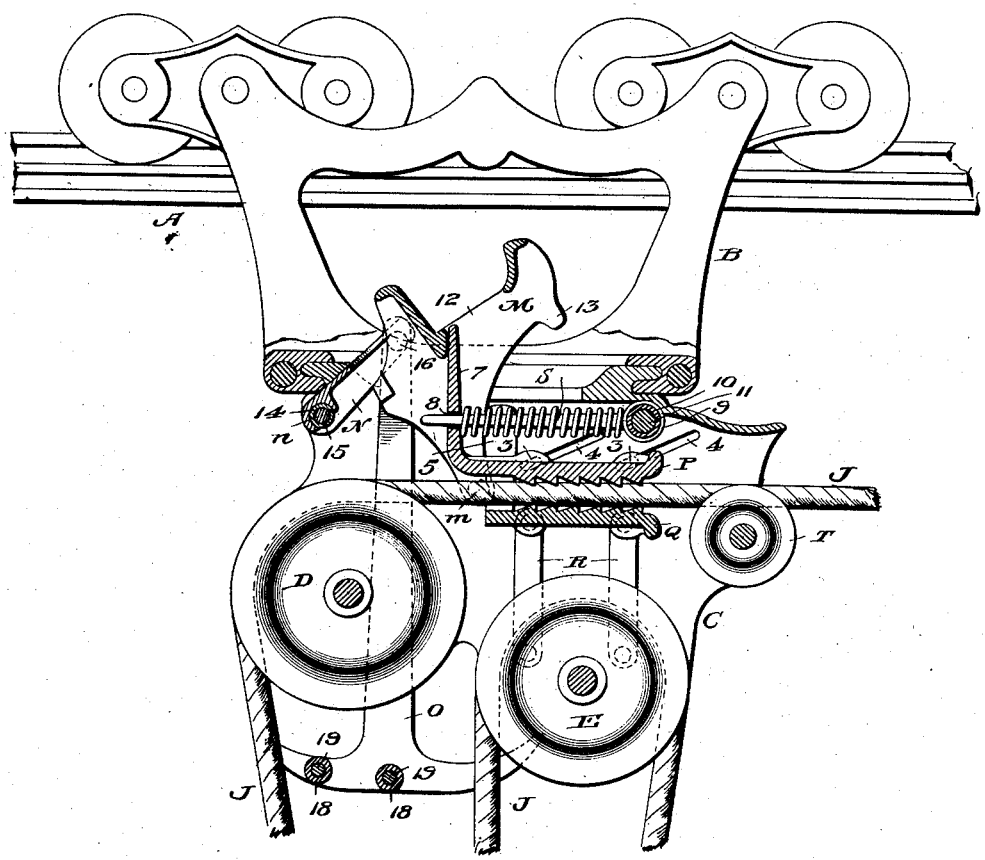
Figure 5:
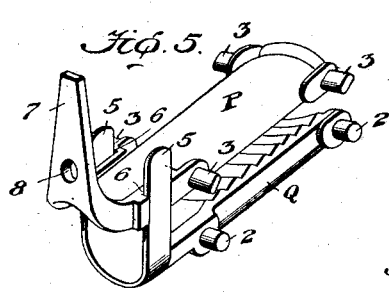
Figure 6:
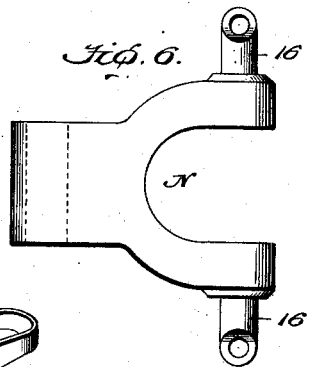
Figure 7:
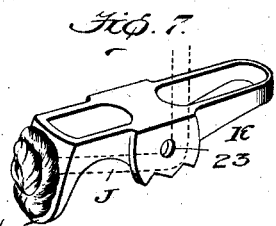

In the accompanying drawings, which form a part of this specification, Figure 1 is a perspective of a hay-carrier embodying my invention. Fig. 2 is a front elevation with portions broken away to show the internal mechanism. Fig. 3 is a detail section on the line 3 3 of Fig. 1. Figs. 4, 5, 6, and 7 are detail views.

In the drawings, A represents an elevated track-rail, and B the upper section of a carrier-frame adapted to run thereon, while C is the lower frame of the carrier swiveled to the upper frame B.

D and E are sheaves journaled in the lower frame C, and F and G are a pair of elevating-pulley frames having the sheaves H H' and I journaled therein.

J is the hoisting-rope, which is passed through the lower section of the carrier-frame over the sheave D, then down around the sheave H in the frame F, then down, under, and around the sheave I in the frame G, then up around the sheave H' in the frame F, then up, over, and around the sheave E in the carrier-frame, and then down to the elevating-pulleys, where it is secured to a trip-casting K.

On the lower edge of the track-rail A a two-pronged stop-block L is secured, and in the frame C of the carrier a two-pronged locking-dog M is pivoted at $m$. A latch N for the dog is also pivoted in said frame C at $n$, and to the free ends of the latch N a yoke O, terminating in T-shaped ends below, is pivoted and is arranged to straddle the lower frame C. Power being applied to the free end of the rope J, the trip-casting K will be brought in contact with the T-shaped ends of the yoke O and will lift the free end of the latch N from the front of the dog M and will permit it to turn on its pivot $m$, when it will assume the position shown in Fig. 2 and will free the carrier from the stop L and permit it to traverse the track-rail A in the usual manner.

When the carrier is returned to the stop, the right-hand prong of the dog M will come in contact with the right-hand prong of the stop L, which will cause the dog to turn on its pivot and will bring its left hand or main prong up between the prongs of the stop L, and the trip-casting K being released from the lower ends of the yoke O the free end of the latch N will drop in front of the dog M and the carrier will again be held stationary on the track-rail A by means of the stop L. While in this position, should the lower frame of the carrier be swiveled around, the left-hand prong of the dog will be held between the prongs of the stop L, and the right-hand prong will be carried around to the opposite end of the stop and will be free to operate in the opposite direction along the track.

To sustain the weight of the load while the carrier is traversing the track, I employ two horizontally-disposed rope-grips P and Q, the former being placed above the rope J and the latter below it. The lower grip is mounted on rocking legs R, which are pivoted at $r$ in the carrier-frame C, and the upper ends of said legs are pivoted to the trunnions 2 on the grip Q. The upper grip P is fitted with lugs 3, which are adapted to slide in inclined slots 4 in the carrier-frame C. The lower grip Q is fitted with upwardly-projecting arms 5, which are adapted to straddle and catch in notches 6 in the upper grip P, so that the horizontal movements of the grips will be in unison.

The location of the legs R is such that when the movement is to the right their upper ends carrying the grip Q will be lowered, while the same movement of the lugs 3 in the slot 4 will raise the grip P. By this movement the grips will be spread apart, and the rope J between them will be released, while the opposite movement will bring the grips together and cause them to grip the rope between them. The tightness of the grip on the rope will also be increased by the weight of the load on the elevating-pulleys drawing the rope in the same direction.

The upper grip P has its inner end 7 bent upwardly at substantially right angles to its body, and there is a perforation 8 in the central portion of this end. A pin S, having an eye 9, which encircles thimbles 10 on the inner sides of the frame C and through which a bolt 11 is passed, has its other end inserted in this perforation 8. A coiled spring encircles this pin, and one of its ends rests against the enlarged end of the pin containing the eye 9, and the other end rests against the upturned end 7. The effect of the spring on the pin S is to push the grip P into engagement with the rope J, and the grip Q being connected to the grip P by the arms 5 is also brought into engagement with the rope.

The extreme upper end of the upturned portion 7 is inserted in a slot 12 in the body of the dog M, and when the dog M is made to assume the position shown in Fig. 1 the grips P and Q are pushed back therewith and the rope J is released, so it can pass freely through the carrier and elevating-pulleys, which is necessary in lowering the tackle and in elevating the load; but when the dog M is released from the stop L, as heretofore described, the spring on the pin S will push the grips into engagement with the rope, and the load will be held in elevated position thereby while the carrier is traversing the track.

The inner faces of the grips P and Q are made semicircular to better conform to the contour of the rope and are preferably fitted with serrations, as shown, to take a firm hold on the rope. In order to prevent the rope when slackened from rubbing against the lower grip Q, I have located in the frame of the carrier a small idle sheave T. By this means the rope is supported when slack and is held from coming in contact with the lower grip Q.

The rear end of the dog M is provided with feet 13, and when the dog is pushed back, as in Fig. 1, these feet will come in contact with the frame of the carrier and prevent the lower pivoted portion of the dog from getting bent or broken by a violent contact with the stop L. The latch N is pivoted to thimbles 14 on the frame of the carrier (similar to those upon which the eye of the pin S is mounted) and through which the bolt 15 (shown in Fig. 1) is passed. These thimbles and the bolts 11 and 15 are also used to hold the two sides of the carrier-frame C together.

The upper ends of the yoke O have eyes which are pivotally fitted on pins 16 on the free ends of the latch N, and said pins have eyes in their ends in which keys 17 are inserted to prevent the ends of the yoke from springing off. The lower T-shaped ends of the yoke O are fitted on their inner faces with similar thimbles 18, through which rivets 19 are passed to hold them together.

On the inner faces of the central portions of the yoke sides are pins or lugs 20, the office of which is to limit the vertical movement of the yoke, openings being formed in the sides of the carrier-frame C, in which these pins or lugs have the necessary movement to permit the latching and unlatching of the dog M by means of the latch N, to which the yoke O is connected.

The trip-casting K has a depressed end 21 with an eye therein, through which eye the rope J is passed and outside of which it is knotted. The rope is also passed below the bolt 22, which passes through holes in the upper ends of the side pieces of the pulley-frame F and through the hole 23 in the casting K. (Shown detached in Fig. 7.) It will be seen that the casting K stands at right angles to the T-shaped ends of the yoke O, and therefore will always come in contact therewith; also, that a convenient point of attachment is provided for the rope J, and that by adjusting the knot of the rope at one end of the casting K the very least amount of vertical space it required, all of which are matters of importance in the construction of hay-carriers.

The frame C is constructed so that the sheaves D and E are located in different horizontal planes, which location affords room for the operation of the grips P and Q immediately above the sheave E, and also the horizontal passage of the rope J direct from the sheave D to and through between the grips P and Q. The whole forms a compact and reliable working carrier.

What I claim is—

1. In a hay-carrier, the combination of a frame having parallel sides with a space between them in which rope-wheels are mounted, and rope-gripping devices mounted in said space, and arranged to move back and forth in approximately horizontal directions in said sides, whereby a rope will be alternately gripped and released between said rope-gripping devices.

2. In a hay-carrier, the combination of a frame having vertically-disposed parallel sides with a space between them, and two opposing rope-gripping devices mounted in said sides, one above and the other below, and arranged to move back and forth in approximately horizontal directions, and to alternately grip and release a rope between them.

3. In a hay-carrier, horizontally-disposed rope-gripping devices, one located above and the other below a rope, the upper grip moving in slightly-inclined slots in the frame of the carrier and the lower grip being mounted on legs pivoted in the frame of the carrier below, the movement back and forth being such as to grip the rope in one direction and release it in the other.

4. In a hay-carrier, the combination of a frame having vertically-disposed parallel sides with a space between them, and rope-gripping devices horizontally mounted in said frame, one above the other, and being connected together so as to move horizontally in unison, and being free to vertically approach and recede from each other, whereby they will alternately grip and release a rope.

5. In a hay-carrier, the combination of a frame having vertically-disposed parallel sides with a space between them, an upper rope-gripper arranged to slide in inclined slots in said sides, a lower rope-gripper mounted on movable legs hinged at their lower ends to said sides, and means to move said grippers back and forth in approximately horizontal directions, whereby they will alternately approach and recede from each other, and grip and release a rope between them.

6. In a hay-carrier, a frame having vertically-disposed parallel sides with a space between them, two rope-wheels mounted in said frame in different vertical and horizontal planes, an elevating-pulley, and a rope having one end connected to said pulley, then passed over the carrier-wheel in the lowest horizontal plane, then down under a sheave or sheaves in the elevating-pulley, then up around the outside and over the top of the upper carrier-wheel, and then in a horizontal direction above the lower carrier-wheel and between rope-gripping devices mounted in the space above said latter wheel and then to the operating power.

7. In a hay-carrier, the combination of a stop affixed to a suspended track, a tilting dog adapted to engage said stop, two horizontally-disposed rope-gripping devices connected so as to move back and forth in unison, an extension on the end of one of said devices adapted to be operated by the dog to release the rope, and of a spring to bring the grip in contact with the rope.

8. In a hay-carrier, the combination with two horizontally-disposed rope-grips adapted to move back and forth and alternately grip and release a rope between them, and two sheaves set in different vertical and horizontal planes, the gripping devices being fitted to work above the lower sheave and to receive the rope in a horizontal direction from the uppermost sheave.

9. In a hay-carrier, two horizontally-disposed rope-grips adapted to move back and forth and alternately grip and release a rope between them, and an idle sheave mounted in the carrier-frame in substantially the same horizontal plane and adapted to hold the rope when slacked from dropping upon the lower gripping device.

10. In a hay-carrier, a stop affixed to a suspended track, a pivoted dog adapted to engage said stop, a latch pivoted at its outer end and its inner end adapted to drop against the dog and hold it in position, a pendent yoke having T-shaped lower ends pivoted at its upper ends to the inner end of the latch, so as to lift it from engagement with the dog, and a trip-casting mounted upon the upper end of an elevating-pulley so as to stand at right angles to the T-shaped ends of the yoke and to come in contact therewith.

11. In a hay-carrier, a trip-casting composed of two parallel horizontally-disposed sides, connected together at each end and a depressed part at one end containing an eye, and a rope adapted to pass into the center of its body and through the eye in the depressed end and be knotted on the outer side of said end.

12. In a hay-carrier, a lock mechanism adapted to hold the carrier stationary on a track, a tripping device to release it therefrom, an elevating-pulley arranged to come in contact with said tripping device, and a trip-casting secured to said elevating-pulley, said casting having a horizontally-disposed body and a vertically-disposed end with an eye therein, whereby a rope may be passed down vertically into the central part of said body, then horizontally through the eye in said vertical end, where it may be knotted to hold it therein.

In witness whereof I affix my signature in the presence of two witnesses.

WILLIAM LOUDEN.

Witnesses:
MAUD T. FINLEY,
S. HUTCHINS.